(12) United States Patent
Nordell et al.

(10) Patent No.: US 10,871,764 B2
(45) Date of Patent: Dec. 22, 2020

(54) MACHINING BASED ON STRATEGIES SELECTED FROM A DATABASE

(71) Applicant: SANDVIK MACHINING SOLUTIONS AB, Sandviken (SE)

(72) Inventors: Hugo Nordell, Hagersten (SE); Vahid Kalhori, Gavle (SE)

(73) Assignee: Sandvik Machining Solutions AB, Sandviken (SE)

( * ) Notice: Subject to any disclaimer, the term of this patent is extended or adjusted under 35 U.S.C. 154(b) by 122 days.

(21) Appl. No.: 16/122,863

(22) Filed: Sep. 5, 2018

(65) Prior Publication Data

US 2019/0384258 A1 Dec. 19, 2019

(30) Foreign Application Priority Data

Jun. 14, 2018 (EP) ..................... 18177834

(51) Int. Cl.
  *G05B 19/00* (2006.01)
  *G05B 19/4097* (2006.01)
(52) U.S. Cl.
  CPC ............. *G05B 19/4097* (2013.01); *G05B 2219/35012* (2013.01); *G05B 2219/36499* (2013.01); *G05B 2219/42155* (2013.01)

(58) Field of Classification Search
  None
  See application file for complete search history.

(56) References Cited

U.S. PATENT DOCUMENTS 10,466,681 B1 * 11/2019 Jones ............... G05B 19/40937
2018/0107186 A1 * 4/2018 Brown ............... G05B 19/0426

* cited by examiner

*Primary Examiner* — Paul B Yanchus, III
(74) *Attorney, Agent, or Firm* — Corinne R. Gorski

(57) ABSTRACT

A method and a corresponding system and computer program product are provided. A model of an object to be manufactured is obtained. Information about one or more available machine tools and one or more available cutting tools is obtained. A geometric feature to be machined as part of manufacturing the object is identified. A database including strategies for machining different geometric features is accessed. The database includes a plurality of strategies defining different ways of machining the identified geometric feature. One or more strategies are selected from the plurality of strategies based on the obtained information. A computer simulation is performed for the one or more selected strategies, and user instructions responsive to the computer simulation are received. Instructions for causing one or more machine tools to manufacture the object via subtractive manufacturing are provided based on the user instructions and a strategy of the one or more selected strategies.

22 Claims, 5 Drawing Sheets

MACHINING BASED ON STRATEGIES SELECTED FROM A DATABASE

RELATED APPLICATION DATA

This application claims priority under 35 U.S.C. § 119 to EP Patent Application No. 18177834.1, filed on Jun. 14, 2018, which the entirety thereof is incorporated herein by reference.

TECHNICAL FIELD

The present disclosure generally relates to machining, and in particular to process planning for machining operations for subtractive manufacturing.

BACKGROUND

Computer-aided design (CAD) models are often employed to define objects to be manufactured. Tolerances and other requirements for the objects to be manufactured may also be obtained via product and manufacturing information (PMI). The manufacturing may be performed via machining operations performed by one or more machine tools. A cutting tool mounted in the machine tool is moved by the machine tool relative to a work piece, so that the cutting tool cuts away material from the work piece to form the object to be manufactured.

Computer-aided manufacturing (CAM) is typically employed to decide how to manufacture the object defined by the CAD model. This is a complicated task involving many factors/parameters such as selecting machine tools, operation sequences (for example involving roughing, semi-finishing and finishing), operation strategies, fixtures for holding the work piece, cutting tools, tool paths, and cutting data (such as feed rate, cutting speed, and depth of cut). These factors affect the quality and precision of the manufactured object, and may also affect the manufacturing time and/or wear on the cutting tools. Hence, CAM programmers often need plenty of time and experience for making suitable tradeoffs so as to reach a suitable solution to this complicated task. Modern CAM software may include some elements of automation for assisting CAM programmers, but CAM programmers still need to rely on experience as well as trial and error to actually reach a suitable solution.

Computer numerically controlled (CNC) machine tools are typically employed for the manufacturing. Post-processing is employed to convert the result of the CAM programming into machine code executable by the control system of the CNC machine tool in which the object is to be manufactured. Machine operators (or CNC operators) often adapt or modify the machine code based on their own knowledge and experience of the machine tool. Preference as regards machining method and for achieving desired results may, for example, lead the machine operator to modify the machine code. It may also be necessary to modify the machine code to make corrections for mistakes made in the CAM programming. CNC operators may need plenty of time and/or experience for making appropriate modifications of the machine code. Moreover, test runs are often employed to check that the machine code actually causes the machine to perform as expected. Computer simulations may also be performed to detect potential problems. Test runs and simulations may, for example, incur extra costs and/or cause delays.

It would be desirable to provide new ways to address one or more of the abovementioned issues.

SUMMARY

Methods, systems and computer program products having the features defined in the independent claims are provided for addressing one or more of the abovementioned issues. Preferable embodiments are defined in the dependent claims.

Hence, a first aspect provides embodiments of a method. The method comprises obtaining (or receiving or retrieving) a model of an object to be manufactured via subtractive manufacturing, and obtaining (or receiving or retrieving) information. The obtained information includes information about (or relating to) one or more machine tools available for manufacturing the object, and information about (or relating to) one or more cutting tools available for use by the one or more machine tools to manufacture the object. The method includes identifying, based on the model, a geometric feature to be machined as part of manufacturing the object, and accessing a database including strategies for machining different geometric features. The database includes a plurality of strategies defining different ways of machining the identified geometric feature. The method includes selecting, based on the obtained information (in other words, based on the information about one or more available machine tools and the information about one or more available cutting tools), one or more strategies from the plurality of strategies, and performing computer simulation for the one or more selected strategies. The method includes receiving user instructions responsive to the computer simulation, and providing (or generating), based on the user instructions and a strategy of the one or more selected strategies, instructions for causing one or more machine tools to manufacture the object via subtractive manufacturing.

The experience and know-how of CAM programmers, machine tool operators and/or persons knowledgeable in the field of subtractive manufacturing (for example metal cutting) may be collected and codified into strategies for machining different geometric features, for facilitating generation of instructions (such as machine code or computer numerical control, CNC, code) for causing machine tools to manufacture objects via subtractive manufacturing. Different strategies for machining a certain geometric feature may be suitable depending on the circumstances and the equipment available. Hence, rather than storing a single strategy for machining a certain geometric feature, the database includes a plurality of strategies defining different ways of machining the same geometric feature, and one or more strategies may be selected based on obtained information about available machine tools and available cutting tools, so that a more suitable/appropriate strategy may be employed for the individual geometric feature and/or for the complete object to be manufactured. The use of a database with strategies, and automatic (or computer-assisted) selection of strategies from the database helps the user to get from a model of the object to be machined (such as a CAD model) to instructions (such as machine code) for causing one or more machine tools to manufacture the object via subtractive manufacturing.

It will be appreciated that the strategies stored in the database need not necessarily be complete recipes specifying in detail how to machine the geometric features. The user may, for example, be allowed to (or even requested to) adapt or complement an automatically selected strategy to suit the current circumstances. The user may, for example, be prompted to indicate which of a plurality of automatically selected strategies to employ. The user may, for example, be prompted to indicate desired cutting data to be employed in a selected strategy. The user may, for example, be prompted to indicate whether some element of a selected strategy should be changed. Still, compared to the conventional approach which was time-consuming and required plenty of experience, the proposed method reduces the complexity of the task faced by the user. Note also that the conventional approach requires CAM software and CAM programming skills. The proposed method may, for example, assist a user without CAM experience to arrive from a model of an object to instructions executable by a machine tool for manufacturing the object. There may, for example, be no need for use of CAM software, or for translating code from CAM software into code executable by a machine tool.

It will also be appreciated that for a strategy stored in the database, all elements of how to perform the machining do not necessarily need to be predetermined. For example, rather than involving use of predetermined cutting data, the strategy may include a formula or algorithm for determining suitable cutting data based on the circumstances. The cutting data may, for example, be determined based on a material from which to manufacture the object, a selected cutting tool, a selected tool path, or user preferences indicated via a user interface.

The one or more selected strategies need not necessarily be optimal (for example fastest, or using the lowest number of cutting tools) among all possible strategies for machining the identified feature, but may be examples of strategies which could be successfully employed for machining the identified geometric feature. Finding the absolute best strategy is practically impossible since the space of theoretically possible strategies for machining a given geometric feature is too large.

The method may, for example, be a computer-implemented method.

The database may, for example, be a digital database.

The one or more strategies may, for example, be selected by a digital processor.

The computer simulation, or results thereof may, for example, be presented (or conveyed) to a user via a display, or some other user interface.

The user instructions may, for example, be received after the computer simulation has been initiated, or after the computer simulation has been completed. The user may, for example, provide the user instructions in response to, or as a reaction to, the computer simulation. The user instructions may, for example, be received via a user interface, such as a human machine interface (HMI).

The user instructions may, for example, include an ok to proceed with a strategy of the one or more selected strategies, or may indicate that a strategy of the one or more strategies should be modified. The instructions for causing one or more machine tools to manufacture the object via subtractive manufacturing may, for example, be provided (or generated) when the user instructions indicate that a selected strategy is acceptable to proceed with.

The obtained information may, for example, indicate a material from which to manufacture the object.

At least some of the obtained information may, for example, be retrieved from a database, or may be received from systems keeping track of the available machine tools, and/or cutting tools and/or fixtures. At least some of the obtained information be entered by a user via a user interface (such as a HMI).

At least some of the obtained information may, for example, be predefined. At least some of the obtained information may, for example, be known in advance and there may be no need to retrieve it.

The information about the one or more available machine tools may, for example, be referred to as machine tool information, and may, for example, indicate properties of the available machine tools.

The information about the one or more available cutting tools may, for example, be referred to as cutting tool information, and may, for example, indicate properties of the available cutting tools.

The information about one or more available machine tools may, for example, indicate which types of cutting tools and/or fixtures that are compatible with the one or more available machine tools, and the selection of the one or more strategies from said plurality of strategies may, for example, be based on such an indication.

According to some embodiments, the method may include identifying, based on the model, a plurality of geometric features to be machined as part of manufacturing the object. For each of the identified geometric features, the method may include accessing a database including strategies for machining different geometric features, where the database includes a plurality of strategies defining different ways of machining the identified geometric feature, and selecting, based on the obtained information, one or more strategies from the plurality of strategies. The instructions for causing one or more machine tools to manufacture the object via subtractive manufacturing may be provided based on a strategy of the one or more selected strategies for each of the identified geometric features. In other words, strategies selected for each of the identified geometric features may be employed for generating the instructions for causing one or more machine tools to manufacture the object.

Some of the identified geometric features may be simple geometric shapes such as flat surfaces, or cylinders, while other identified geometric features may include more complicated shapes having several subfeatures. By splitting the object to be manufactured into a plurality of more simple geometric features, the task of finding a suitable strategy to manufacture the entire object may be divided into simpler subtasks. In this way, there is no need for a database including separate strategies for machining each and every imaginable object, but instead a collection of strategies for machining common (for example relatively simple) geometric features may be employed.

According to some embodiments, the identified geometric feature may include multiple subfeatures. The plurality of strategies may define different orders in which to machine the subfeatures. The subfeatures may, for example, constitute different parts or portions of the identified geometric feature. The subfeatures may, for example, have different shapes or sizes.

The order in which the subfeatures should be machined (for example to avoid collisions, to save time, or to achieve a desired precision or a desired surface smoothness) may, for example, depend on availability of certain machine tools, and cutting tools, which may be indicated by the obtained information.

According to some embodiments, the plurality of strategies may define different patterns of tool paths for machining the identified geometric feature. The tools paths employed in the different strategies may form different patterns. The different patterns may, for example, have different shapes (for example one pattern with circular tool paths and another pattern with linear/straight tool paths moving back and forth along a surface), or the tool paths may, for example, form different angles relative to each other in the different patterns. The patterns may, for example, include three-dimensional movement (for example not only movement in a horizontal plane but also movement up/down), and movement with constant velocity or variable velocity. The pattern of tool paths that should be employed (for example to avoid collisions, to save time, or to achieve a desired precision or a desired surface smoothness) may depend on availability of certain machine tools and cutting tools, which may be indicated by the obtained information.

According to some embodiments, the obtained information may indicate one or more cutting tools available at the one or more machine tools or available in a building where the one or more machine tools are arranged. The one or more strategies may be selected based on the one or more indicated cutting tools.

The one or more selected strategies may, for example, only employ cutting tools which are actually available at the one or more available machine tools, or in their vicinity. This may allow the machining to be performed straight away, instead of the user having to wait for new cutting tools to be delivered from a remote location before the machining can be performed.

According to some embodiments, the obtained information may indicate a tool interface of a machine tool of the one or more machine tools available for manufacturing the object. The one or more strategies may be selected based on one or more cutting tools compatible with the tool interface.

According to some embodiments, a strategy of the selected one or more strategies may include use of a cutting tool compatible with the tool interface but unavailable at the machine tool having the tool interface or unavailable in a building where the machine tool having the interface is arranged.

The strategy may, for example, include use of a cutting tool that is available at a remote location (such as in a warehouse), or which has recently become available for purchase. A newly developed cutting tool may, for example, be able to reduce the manufacturing time or improve the precision, but the user may be unaware of its existence or its performance. A method that selects strategies involving such cutting tools may help the user to identify ways to improve the machining performance.

According to some embodiments, the obtained information may further indicate whether a cutting tool which is compatible with the tool interface, but unavailable at the machine tool having the tool interface or unavailable in a building where the machine tool having the interface is arranged, is available at another location. The one or more strategies may be selected based on the further indication.

A strategy involving use of a cutting tool not currently available at a machine tool having the interface (or in a building where the machine tool is located) may, for example, be selected only if the cutting tool is available at some other location so that the cutting tool can be retrieved or purchased.

According to some embodiments, the obtained information may indicate a maximal rotation speed for a spindle of a machine tool of the one or more machine tools available for manufacturing the object, and/or may indicate a maximal torque for a spindle of a machine tool of the one or more machine tools available for manufacturing the object, and/or a maximal load for a spindle of a machine tool of the one or more machine tools available for manufacturing the object. The selection of one or more strategies from the plurality of strategies may be based on the maximal rotation speed and/or the maximal torque and/or the maximal load. Some strategies may, for example, not be suitable unless the spindle is able to handle a sufficiently high rotation speed and/or a sufficiently high torque and/or a sufficiently high load.

According to some embodiments, the obtained information may indicate which type of machining operations (such as turning, drilling, milling etc.) one or more available machine tools are adapted to perform. Some of the strategies stored in the database may, for example, require use of certain machining operations. The selection of one or more strategies from the plurality of strategies may, for example, be based on the indicated type of machining operation, According to some embodiments, the obtained information may indicate whether one or more available machine tools are adapted for 3-axis machining, 4-axis machining, 5-axis machining, N-axis machining (where N is larger than 5), or a combination thereof. N may, for example, be 6, 7, 8 or 9. Some of the strategies stored in the database may, for example, be more suitable for 5-axis machining than for 3-axis machining. The selection of one or more strategies from the plurality of strategies may, for example, be based on the indicated number of axes.

It will be appreciated that a machine tool which is able to perform full 5-axis machining (where all 5 axes are employed at the same time) may, for example, be employed to perform 3+2-axis machining, where the machine tool may, for example, execute a 3-axis milling program while the cutting tool is locked in a tilted position using the remaining 2 axes. Some components may, for example, be more efficiently manufactured via 3+2-axis machining, even if full 5-axis machining is available.

According to some embodiments, the obtained information may indicate whether the one or more available machine tools include a machine tool operable to perform a combination of milling and turning. The machine tool may, for example, be operable to perform machining operations with a rotating work piece and a rotating cutting tool.

According to some embodiments, the obtained information may indicate whether a spindle of a machine tool of one or more available machine tools is adapted for vertical machining or horizontal machining. Some of the strategies stored in the database may, for example, be more suitable for vertical machining than horizontal machining (or better suited for horizontal machining than vertical machining). The selection of one or more strategies from the plurality of strategies may, for example, be based on the indicated machining direction (vertical or horizontal machining).

According to some embodiments, a machine tool of one or more available machine tools may include an arm for holding a cutting tool or a work piece. The obtained information may indicate a degree of susceptibility of the arm to deflection, and/or a degree of susceptibility of the arm to vibration. The selection of one or more strategies from the plurality of strategies may be based on the indicated degree of susceptibility to deflection and/or to vibration.

Some strategies in the database may, for example, be more likely to cause deflection or vibration. Such strategies may, for example, be employed with machine tools which are not that susceptible to deflection or vibration, so that deflections or vibrations do not adversely affect the quality or precision of the manufactured object.

According to some embodiments, the obtained information may include information about one or more fixtures available for holding a work piece at one or more machine tools during manufacturing of the object.

The information about the one or more available fixtures may, for example, be referred to as fixture information, and may, for example, include properties of the available fixtures. Properties of the fixtures may affect the machining operations. Large fixtures may, for example, cause collisions with cutting tools, and some fixtures may, for example, hold the work piece in position more firmly than others. The selection of one or more strategies from the plurality of strategies may, for example, be based on the fixture information.

According to some embodiments, the obtained information may indicate one or more fixtures available at the one or more available machine tools or in a building where the one or more available machine tools are arranged. The one or more strategies may be selected based on the one or more indicated fixtures.

The one or more selected strategies may, for example, only employ fixtures which are actually available at the one or more available machine tools, or in their vicinity. This may allow the machining to be performed straight away, instead of the user having to wait for new fixtures to be delivered from a remote location before the machining can be performed.

According to some embodiments, the obtained information may indicate which one or more types of fixtures that are compatible with an available machine tool. A strategy of the selected one or more strategies may include use of a fixture which is compatible with the available machine tool but is unavailable at the available machine tool or is unavailable in a building where the available machine tool is arranged.

The strategy may, for example, include use of a fixture that is available at a remote location (such as in a warehouse), or which has recently become available for purchase. Use of a new fixture may, for example, be able to reduce the manufacturing time or improve the precision, but the user may be unaware of its existence or its advantages. A method that selects strategies involving such a fixture may help the user to identify ways to improve the machining performance.

According to some embodiments, the obtained information may indicate which one or more types of fixtures that are compatible with an available machine tool. The obtained information may further indicate whether a fixture compatible with the available machine tool, but unavailable at the available machine tool or unavailable in a building where the available machine tool is arranged, is available at another location. The one or more strategies may be selected also based on the further indication.

A strategy involving use of a fixture not currently available at a compatible machine tool (or in a building where the compatible machine tool is located) may, for example, be selected only if the fixture is available at some other location so that the fixture can be retrieved or purchased to be employed by the compatible machine tool.

According to some embodiments, the method may include receiving product and manufacturing information (PMI) indicating a tolerance for the object to be manufactured. The selection of the one or more strategies may be based also on the received PMI. The PMI may, for example, also indicate geometric dimensions, shape accuracy, and work piece material specifications.

According to some embodiments, each of the one or more selected strategies may include one or more machine tools for performing the manufacturing, one or more cutting tools for use by the one or more machine tools, one or more fixtures for holding a work piece, and tool paths for the one or more cutting tools.

A strategy stored in the database may, for example, include further elements/items, such as a work piece material from which to manufacture the object, information about how to determine cutting data (such as feed rate, cutting speed and depth of cut), and information about whether to perform only roughing and finishing, or to also perform semi-finishing.

According to some embodiments, the user instructions may indicate selection of a strategy from among the one or more strategies previously selected from the plurality of strategies. The instructions for causing one or more machine tools to manufacture the object via subtractive manufacturing may, for example, be provided (for example generated) based on the selected strategy. In other words, the user may indicate (via the user instructions) which of the one or more selected strategies to employ for manufacturing the object.

According to some embodiments, the user instructions may indicate modification of a strategy of the one or more strategies previously selected from the plurality of strategies to obtain a modified strategy. In other words, the user may indicate that a modified strategy is to be obtained by modifying a strategy of the one or more already selected strategies. The instructions for causing one or more machine tools to manufacture the object may, for example, be provided based on the modified strategy. The user may, for example, detect (for example via the computer simulation) that one of the selected strategies does not seem to perform as intended, and may indicate that it should be modified before the instructions to the one or more machine tools are generated.

According to some embodiments, the step of selecting, based on the obtained information, one or more strategies from the plurality of strategies may include selecting, based on the obtained information, one or more preliminary strategies from the plurality of strategies, receiving initial user instructions (for example via a user interface), and performing an updated selection, based on the user instructions, of one or more strategies from the plurality of strategies. The instructions for causing at least one of the one or more machine tools to manufacture the object may be provided (or generated) based on a strategy from the one or more strategies of the adapted selection. The initial user instructions may indicate a machine tool employed in the one or more preliminary strategies to be avoided when machining the geometric feature, and/or a machine tool to be employed for machining the geometric feature, and/or a cutting tool employed in the one or more preliminary strategies to be avoided when machining the geometric feature, and/or a cutting tool to be employed for machining the geometric feature, and/or a fixture employed in the one or more preliminary strategies to be avoided when machining the geometric feature, and/or a fixture to be employed for machining the geometric feature, and/or tool paths employed in the one or more preliminary strategies to be avoided when machining the geometric feature, and/or tool paths to be employed for machining the geometric feature.

The one or more preliminary strategies may, for example, be presented to the user via a user interface, such as a HMI. If the user would like to avoid use of certain equipment (such as a machine tool, a cutting tool or a fixture), or believes that use of certain equipment may improve the machining performance compared to the one or more preliminary strategies, the user may indicate this via the initial user instructions, so that the selection of strategies may be adapted accordingly.

An initial computer simulation may, for example, be performed for the one or more preliminary strategies, and the user may, for example, provide the initial user instructions responsive to the initial computer simulation.

According to some embodiments, the one or more machine tools available for manufacturing the object may be numerically controlled (NC) machine tools, for example computer numerically controlled (CNC) machine tools. The instructions provided based on the user instructions and a strategy of the one or more selected strategies may include machine code (for example CNC code) executable by the one or more machine tools.

The machine code may, for example, be provided in a format which is directly executable by the one or more machine tools. There may, for example, be no need for post processing of the machine code for adapting the machine code to the one or more machine tools. The machine code may, for example, include canned cycles.

According to some embodiments, the method may further include storing the plurality of strategies in the database prior to obtaining the model. In other words, the strategies may be stored in advance, so that one or more suitable strategies may be selected from the database after the model of the object to be manufactured has been obtained.

A second aspect provides embodiments of a computer program product. The computer program product includes a computer-readable medium with instructions which, when executed by a computer, cause the computer to perform the method of any one of the embodiments of the first aspect.

The computer-readable medium may, for example, be a transitory computer-readable medium (such as a signal or wave carrying the instructions from a transmitter to a receiver) or a non-transitory computer-readable medium (such as a memory on which the instructions are stored).

The effects and/or advantages presented above for embodiments of the method according to the first aspect may also apply to corresponding embodiments of the computer program product according to the second aspect.

A third aspect provides embodiments of a system configured to obtain a model of an object to be manufactured via subtractive manufacturing, and obtain information. The obtained information includes information about one or more machine tools available for manufacturing the object, and information about one or more cutting tools available for use by the one or more machine tools to manufacture the object. The system is configured to identify, based on the model, a geometric feature to be machined as part of manufacturing the object, and to access a database including strategies for machining different geometric features. The database includes a plurality of strategies defining different ways of machining the identified geometric feature. The system is configured to select, based on the obtained information, one or more strategies from the plurality of strategies, perform computer simulation for the one or more selected strategies, and receive user instructions responsive to the computer simulation. The system is configured to provide, based on the user instructions and a strategy of the one or more selected strategies, instructions for causing one or more available machine tools to manufacture the object via subtractive manufacturing.

The system may, for example, have one or more processors configured to perform the method as defined in any of the embodiments of the first aspect.

The system may, for example, include the database.

The system may, for example, include a user interface (for example a HMI) for receiving the user instructions.

The system may, for example, include a display (or screen) for presenting the computer simulation or results thereof to a user.

The system may, for example, include a machine code generator configured to generate the instructions for causing the one or more available machine tools to manufacture the object via subtractive manufacturing.

The system may, for example, include the one or more available machine tools, and/or the one or more available cuttings tools, and/or one or more available fixtures.

The effects and/or advantages presented above for embodiments of the method according to the first aspect may also apply to corresponding embodiments of the system according to the third aspect.

It is noted that embodiments of the present disclosure relate to all possible combinations of features recited in the claims.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

In what follows, example embodiments will be described in greater detail with reference to the accompanying drawings, in which.

All the figures are schematic, not necessarily to scale, and generally only show parts which are necessary in order to elucidate the respective embodiments, whereas other parts may be omitted or merely suggested.

DETAILED DESCRIPTION

Figure 1:
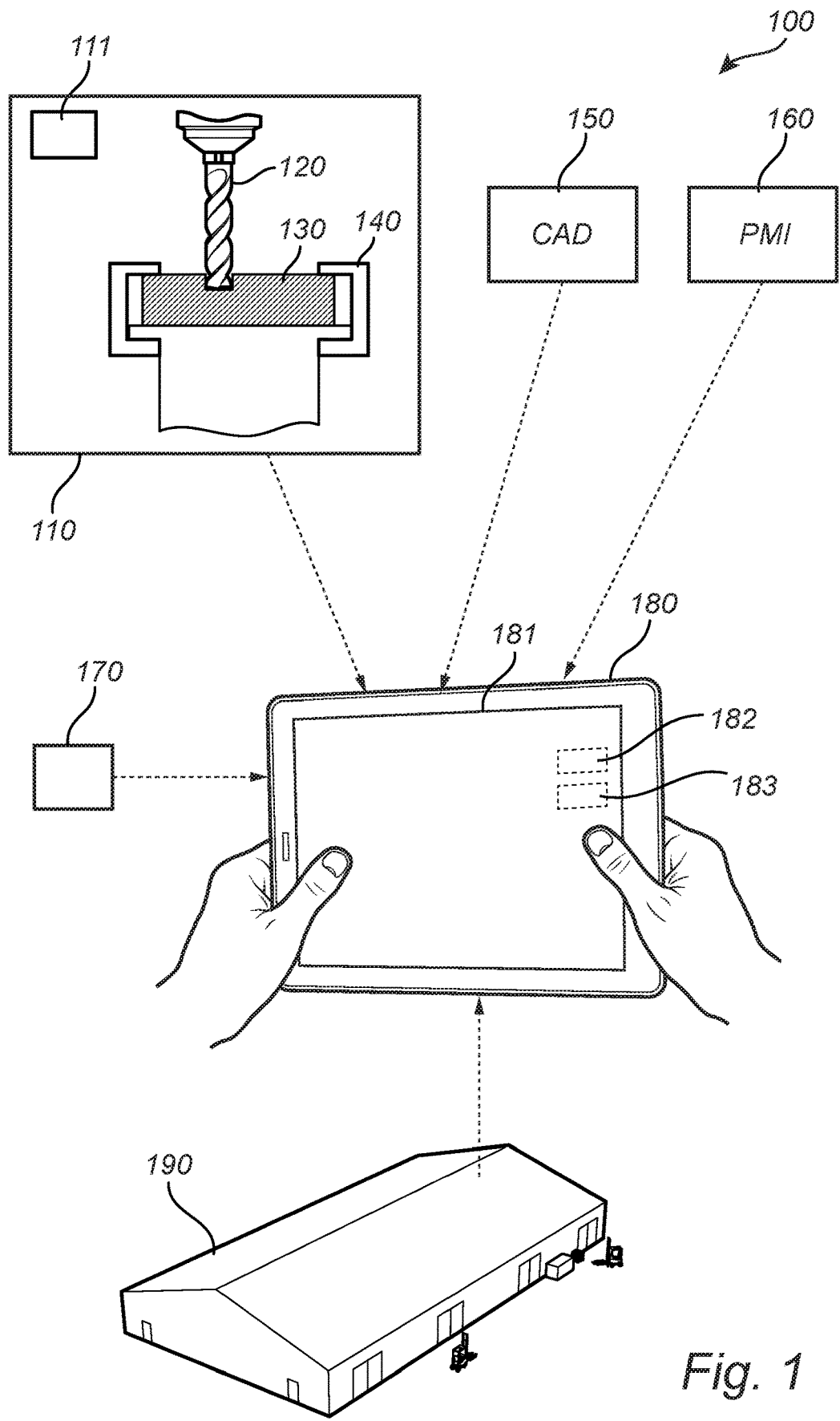
FIG. 1 is a schematic overview of an example machining site and associated equipment.

FIG. 1 is a schematic overview of a machining site 100 and associated equipment. One or more machine tools 110 are arranged at the machining site 100 for performing subtractive manufacturing. The machine tools 110 may, for example, be adapted for metal cutting. The machine tools 110 may be adapted to perform machining operations, for example metal cutting operations, such as drilling, milling, turning, reaming, or threading. A machine tool database may, for example, be employed to keep track of the available machine tools 110.

One or more cutting tools 120 are available for use by the machine tools 110 to perform machining operations where a cutting tool 120 moves relative to a work piece 130 for cutting away material from the work piece 130. Cutting tools 120 available for use by a machine tool 110 may, for example, be arranged in a tool magazine (not shown) from which the cutting tools 120 may be fed into position in the machine tool 120 to replace the previously used cutting tool 120. The cutting tools 120 may, for example, be replaced by a robotic arrangement or may be replaced manually. A cutting tool database may, for example, be employed to keep track of the available cutting tools 120.

The cutting tools 120 may include general purpose cutting tools as well as cutting tools specifically adapted for cutting in certain materials or for cutting certain shapes. Some of the cutting tools 120 may be solid cutting tools formed in a single piece of material such as steel or cemented carbide. Some of the cutting tools 120 may consist of multiple pieces fitted together to form the cutting tool. Some of the cutting tools 120 may, for example, be equipped with replaceable cutting inserts (not shown). The cutting inserts may, for example, comprise cemented carbide or ceramic material, and may, for example, be provided with various coatings for meeting user requirements. The coatings may, for example, be adapted for cutting in certain materials, and/or may be adapted for improving heat resistance and/or wear resistance. One or more fixtures 140 are available for holding the work piece 130 in position during the machining. Fixtures 140 available for use by a machine tool 110 may, for example, be stored in a vicinity of the machine tool 110 so that the fixtures 140 may be retrieved when needed to replace the currently employed fixture 140. The fixtures 140 may, for example, be replaced by a robotic arrangement or may be replaced manually.

It will be appreciated that the fixture 140 depicted in FIG. 1 is an example, and that many other types of fixtures may be envisaged.

The machine tools 110 may be equipped with cooling systems (not shown) for providing cooling during machining. The cooling may, for example, be provided via a cooling fluid.

The machine tools 110 are equipped with control systems 111 for controlling the machine tools 110. The control system 111 of a machine tool may, for example, control servos of the machine tool 110 for moving the cutting tool 120 relative to the work piece 130. In some machine tools 110, the control system 111 may cause both the cutting tool 120 and the work piece 130 to move. The machine tools 110 may, for example, be computer numerically controlled (CNC) machine tools 110, and the control system 111 may be adapted to execute CNC code.

An object to be manufactured is defined by a model 150, such as a three-dimensional CAD model 150. Tolerances for the object regarding shape accuracy, geometric dimensions and/or surface finish may be specified via product and manufacturing information (PMI) 160. The PMI 160 may also specify the material to be employed to manufacture the object.

For the machine tools 110 to be able to manufacture the object in accordance with the model 150 and the PMI 160, appropriate instructions need to be generated for the control systems 111 of the machine tools 110.

Generation of such instructions is a complicated task involving selection of for example operation sequences (for example in which order to perform different operation steps such as facing, hole making, and threading), machine tools 110, cutting tools 120, fixtures 140, tool paths and cutting data (such as feed rate, cutting speed, and depth of cut). These factors affect the quality and precision of the manufactured object, and may also affect the manufacturing time and/or wear on the cutting tools. Hence, generation of suitable instructions for the control system 111 usually involves plenty of trial and error, even for experienced people.

However, persons knowledgeable in the field of subtractive manufacturing, and companies with extensive experience in developing cutting tools, have collected plenty of knowledge over time regarding how to machine different geometric features. This knowledge may be codified and stored as strategies in a database 170. The database 170 includes strategies for machining different geometric features.

Figure 3:
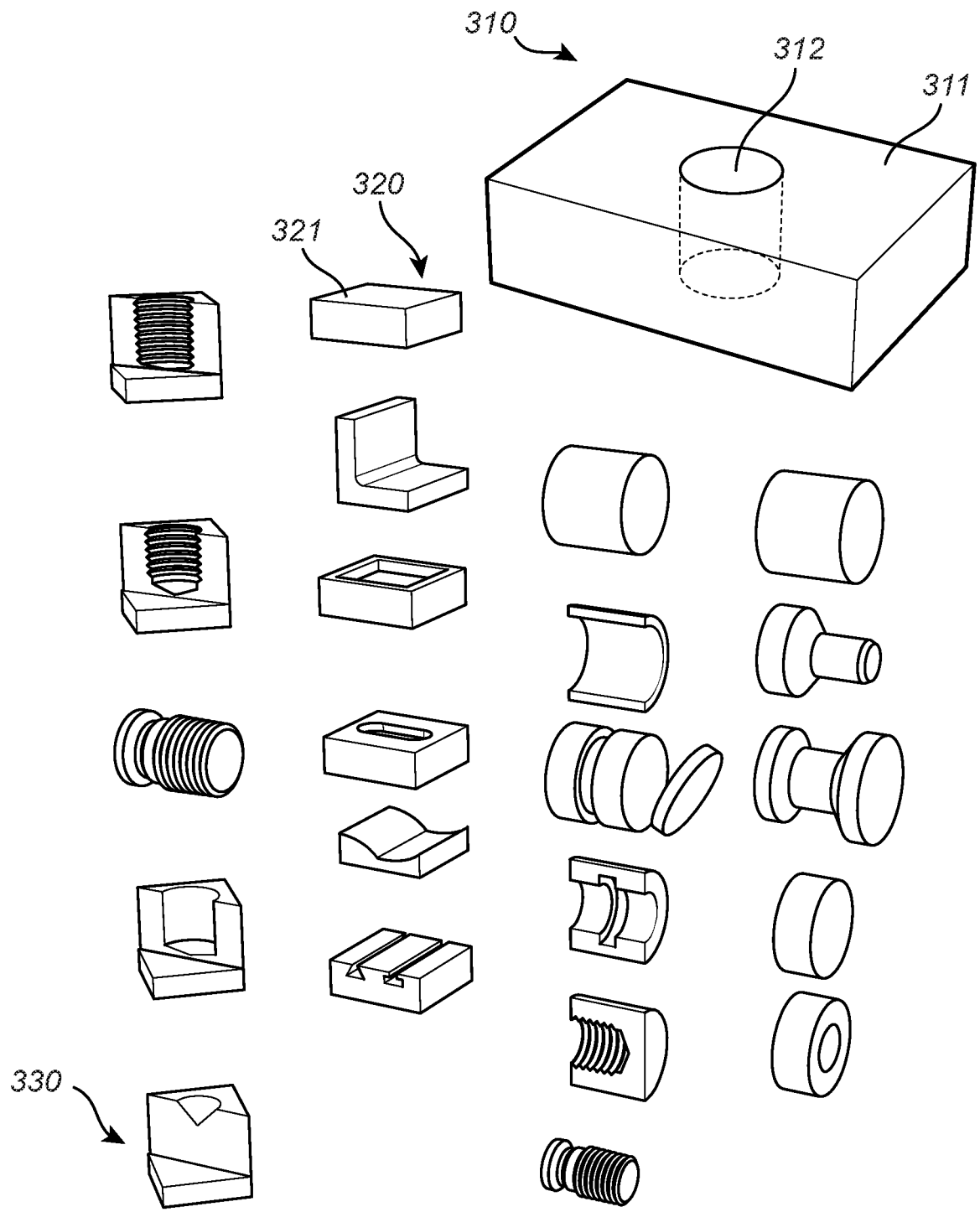
FIG. 3 shows perspective views of example geometric features for which strategies may be stored in a database.

FIG. 3 shows perspective views of example geometric features for which associated strategies are included in the database 170. The geometric features covered by the database may, for example, include a collection of common features which may have relatively simple geometries. The geometric features covered by the database 170 may also include more complicated features having several subfeatures such as holes or threads. Even quite complicated features may be included in the database 170, as long as suitable strategies for manufacturing them have been devised.

For a given object to be manufactured, geometric features to be machined as part of manufacturing the object may first be identified. The database 170 may then be employed to find strategies for machining the identified geometric features.

Although strategies for many geometric features may have been stored in the database 170, there may of course be some features lacking entries in the database 170. The database 170 may therefore be built up over time to cover even more geometric feature (or shapes) as new strategies are figured out by people in the technical field.

For at least some geometric features, the database 170 includes a plurality of strategies defining different ways of machining the same geometric feature. Strategies may therefore be selected from the database based on the current circumstances.

FIG. 3 shows an object 310 having several flat surfaces 311 and a hole 312 with an opening in the top surface 311. A first example geometric feature to be machined may consist of the upper flat surface 311 and the hole 312. In other words, the first example geometric feature has two subfeatures 311 and 312. In a first strategy for machining the geometric feature, the hole 312 is machined first, and the surface 311 is machined afterwards. In a second strategy, the surface 311 is machined first, and the hole 312 is machined afterwards.

Drilling of the hole 312 after forming the surface 311 (as in the second strategy) may cause deformations (or damage) at the surface 311 close to where the drill enters the hole 312. Forming the surface 311 after drilling the hole 312 (as in the first strategy) may cause deformation in the hole 312 close to the surface 311. Whether the deformations caused by the respective strategies are acceptable may depend on the tolerances specified for the object to be manufactured, but also on the cutting tools available for performing the machining. Some drills may, for example, cause more deformations to the surface 311 than others, so that an additional machining operation is required to remove the deformations caused by the drilling. In such cases, the first strategy (machining the hole 312 first) may be more suitable than the second strategy (machining the surface 311 first). Selection of a suitable strategy from the database 170 may therefore be based on the available cutting tools.

Another factor that may affect the selection between the first and second strategies is bending of the drill employed to make the hole 312, which may affect precision. Machining of the surface 311 first reduces the depth of the hole 312 to be drilled, which may affect how much the drill may bend.

Further, if the available drills are short, it may be desirable to employ the second strategy (machining the surface 311 first), since machining of the surface 311 first reduces the depth of the hole 312 to be drilled so that the drill reaches far enough to make the hole.

Figure 4:
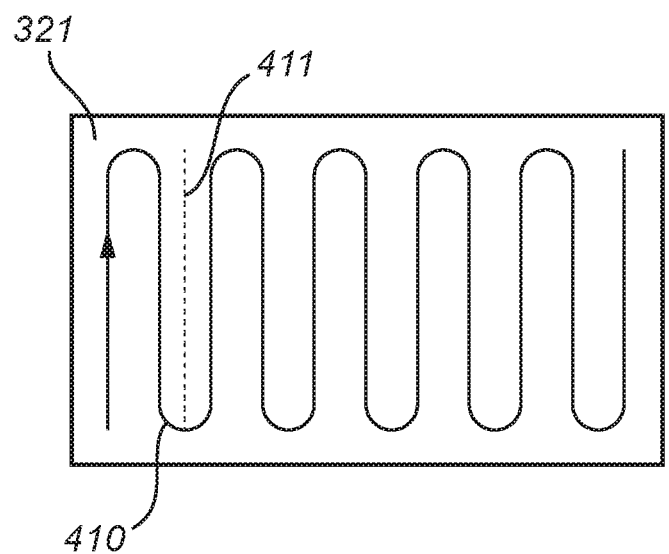
FIG. 4 shows two different example tool path patterns for machining the same geometric feature.
Figure 4:
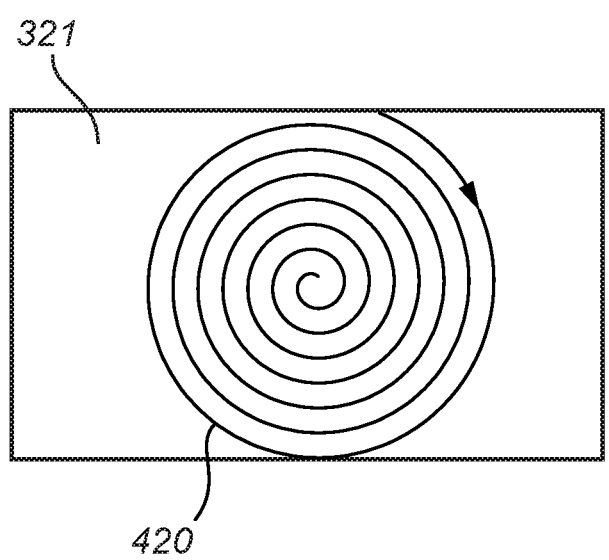

A second example geometric feature is the flat upper surface 321 of the object 320 shown in FIG. 3. FIG. 4 shows two different example tool path patterns for machining the geometric feature 321. FIG. 4 shows the example feature 321 from above. A first strategy for machining the feature 321 employs a tool path that passes back and forth across the surface 321 to form a first tool path pattern 410. A second strategy for machining the feature 321 employs a tool path that spirals inwards towards the center of the surface 320 to form a second tool path pattern 420.

It will be appreciated that the tool path patterns shown in FIG. 4 are schematic, and that the spiral-shaped tool path pattern 420 may, for example, be larger so that it covers the entire surface 321.

The first tool path pattern 410 is rather simple and convenient to use. However, the fact that the cutting tool moves back and forth means that it passes the area along the dotted line 411 in different directions at the respective sides of the line 411, which may cause undesired roughness or uneven areas along the dotted line 411 when certain cutting tools are employed. The selected strategy may also have a negative influence on tool life or may in some cases cause tool breakage.

The second tool path pattern 420 allows the cutting tool to perform cutting in a more uniform way along the tool path (compared to the first tool path pattern 410 where the cutting tool may pass in and out of cut). The second tool path pattern 420 does not suffer from the potential problems associated with the first tool path pattern 410, and may therefore be preferable for some cutting tools. Selection of a suitable strategy from the database 170 may therefore be based on the available cutting tools.

Note that the number of passes back and forth over the surface 321 in the first tool path pattern 410 may be adapted based on the size of the available cutting tool. If a milling cutter with small diameter is employed, then a large number of passes may be needed. If a milling cutter with larger diameter is employed, then a smaller number of passes may be employed. This may, for example, affect the manufacturing time and/or tool wear.

The example strategies described above with reference to FIGS. 3 and 4 are relatively simple since they relate to relatively simple shapes 310 and 320. It will be appreciated that strategies for machining more complicated features (such as the example feature 330 shown in FIG. 3) are typically more complicated. The skilled person realizes that strategies for machining more complicated geometric features may, for example, involve several different machining operations using different cutting tools and several different tool path patterns. Machining of some geometric features may, for example, include steps such as roughing, semi-finishing and finishing. Each of these steps may, for example, include several machining operations. The skilled person also realizes that a single strategy may include several machining operations performed by different machine tools 110. By selecting between different strategies, one may not only influence the order in which machining operations are performed, but also the order in which the different machine tools 110 are employed.

It will be appreciated that the database 170 may include strategies for machining many more geometric features than those shown in FIG. 3. It will also be appreciated that the tool path patterns 410 and 420 described above with reference to FIG. 4 are only intended as simple examples, and that other tool path patterns (for example including tool paths in three dimensions rather than tool paths in a plane as in FIG. 4) may also be envisaged.

A system 180 is adapted to generate instructions for causing the machine tools 110 to manufacture the object defined by the model 150 and the PMI 160. The system 180 is equipped with a user interface 181 for user interaction. The user interface 181 may, for example, be a human machine interface (HMI). The HMI may, for example, include a touch screen 181 and one or more keys or buttons. The system 180 is adapted to select strategies from the database 170 and to generate instructions for the machine tools 110. Such tasks may, for example, be performed by one or more processors 182. The processors 182 may, for example, be digital processors.

The system 180 may, for example, be located at the machining site 100 in the form of a stationary or laptop computer, a tablet computer or a smart phone, equipped with suitable software. In other embodiments, the system 180 may, for example, be integrated as a part of one or more of the machine tools 110. Alternatively, the system 180 may be arranged at a remote location, or may be cloud-based. The system 180 may, for example, include the database 170. Embodiments may also be envisaged in which the database 170 is arranged at a remote location, or in which the database 170 is cloud-based.

Figure 5:
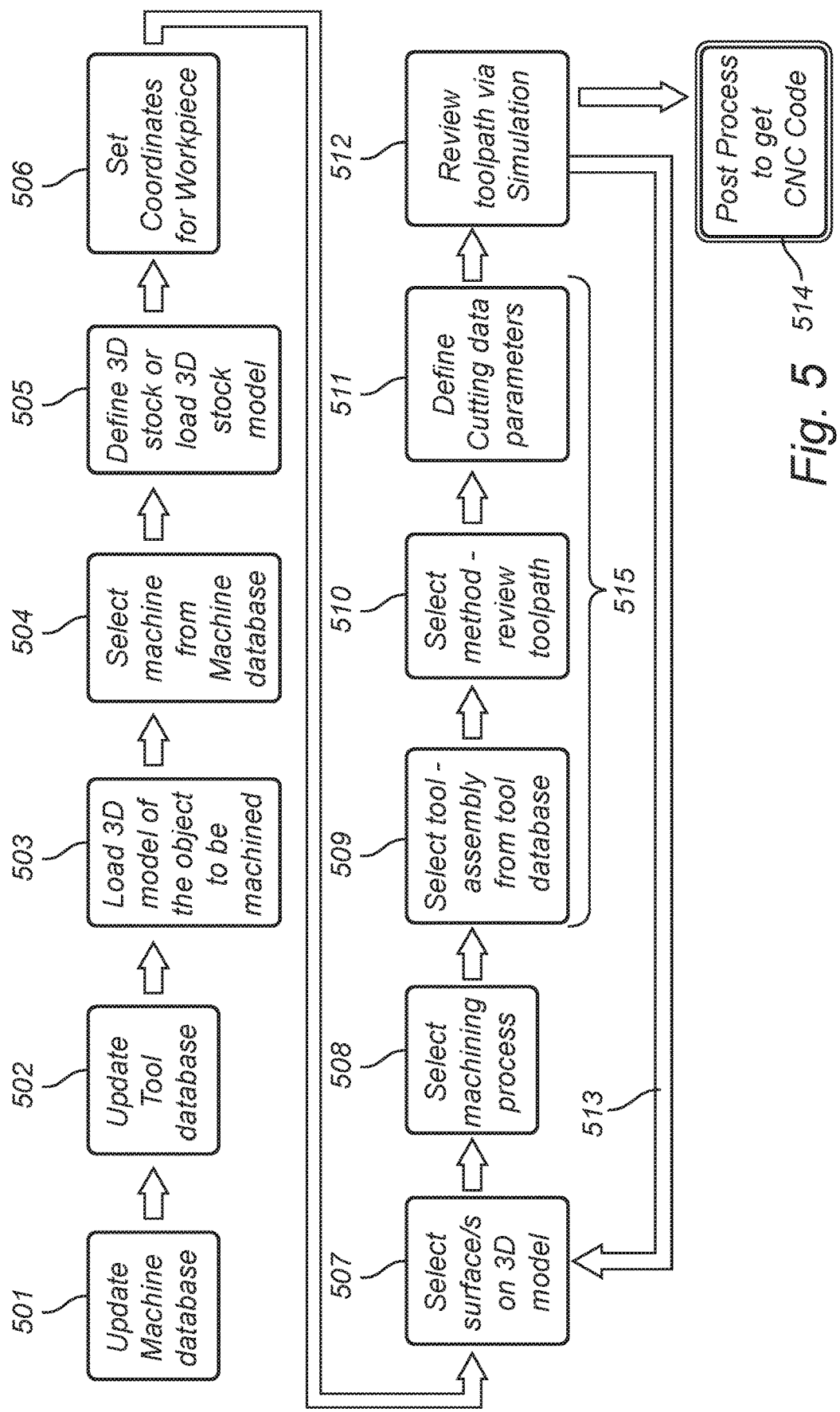
FIG. 5 is a flow chart of how a user may interact with a tablet computer for generating instructions for causing one or more machine tools at the machining site in FIG. 1 to manufacture an object, according to an embodiment.

In a preferred embodiment, which will be described below with reference to FIG. 5, the system 180 is implemented as a software application running on a tablet computer.

Figure 2:
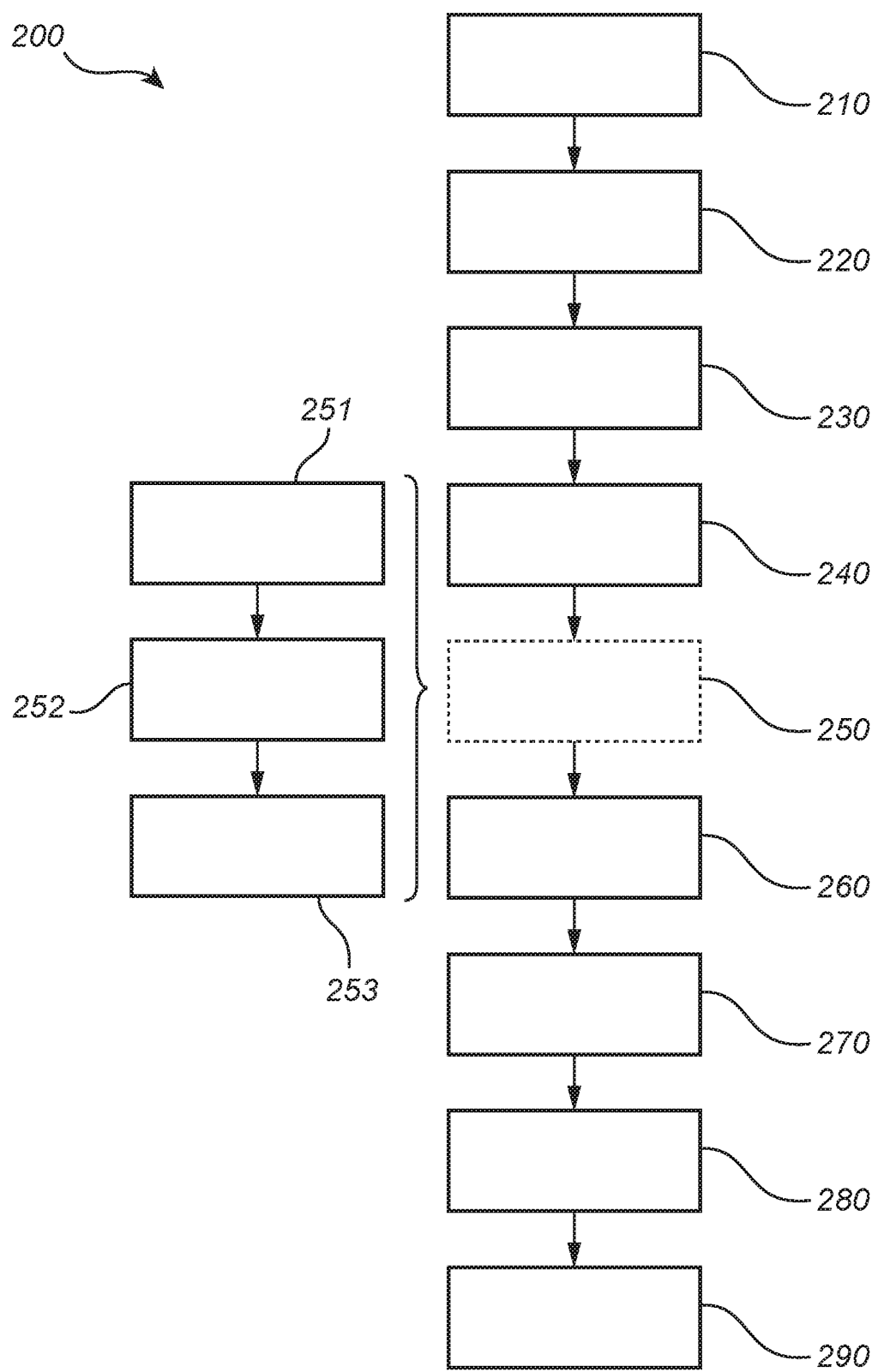
FIG. 2 is a flow chart of a method for generating instructions for causing one or more machine tools at the machining site in FIG. 1 to manufacture an object, according to an embodiment.

Operation of the system 180 will now be described with reference to FIG. 2. FIG. 2 is a flow chart of a method 200 performed by the system 180 for obtaining machine tool instructions, according to an embodiment.

In a first step, the model 150 of an object to be manufactured via subtractive manufacturing is obtained 210. In the present embodiment, the model is a computer-aided design (CAD) model generated by a component designer at a remote computer, and the CAD model is received by the system 180. However, embodiments may also be envisaged in which the CAD model 150 is generated by the system 180, or by a user of the system 180.

The PMI 160 may, for example, be obtained with the CAD model 150.

Information is then obtained 220 about the manufacturing site and the available equipment, so that a suitable machining strategy may be determined. The obtained information includes information (which may be referred to as machine tool information) about the one or more machine tools 110 available for manufacturing the object and information (which may be referred to as cutting tool information) about the one or more cutting tools 120 available for use by the one or more machine tools 110 to manufacture the object. The obtained information may also include information (which may be referred to as fixture information) about the one or more fixtures 140 available for holding a work piece 130 at the one or more machine tools 110 during manufacturing of the object. The obtained information may, for example, also include information about the material of the work piece 130 from which to machine the object. The work piece material typically affects the selection of which cutting tools 120 and cutting data to employ for the machining.

The obtaining 220 of information may be automatic, or may involve various degrees of interaction with the user of the system 180. Some of the obtained information may, for example, be predefined, and may not need to be retrieved. In the present embodiment, the system 180 retrieves the machine tool information from a machine tool database (not shown) which keeps track of the available machine tools 110 and their properties. Alternatively, the system 180 may receive the machine tool information from the machine tools 110 themselves, for example via wireless communication.

The system 180 informs the user of the automatically retrieved machine tool information, which may include a list of the available machine tools 110. The user is asked to confirm that the retrieved machine tool information is correct, or to correct the machine tool information. The user may, for example, add or remove machine tools 110 from a list. The user interaction may, for example, be performed by clicking on a touch screen 181.

Embodiments may also be envisaged in which the user enters the machine tool information manually. The system 180 may, for example, present a list of machine tools 110 and the user may select the available machine tools 110 from the list.

In the present embodiment, the system 180 retrieves the cutting tool information from a tool management system which keeps track of the cutting tools 120 available for use by the machine tools 110. Alternatively, the system 180 may receive the cutting tool information from the cutting tools 120 themselves, for example via wireless communication.

The system 180 informs the user of the automatically retrieved cutting tool information, which may include a list of the available cutting tools 120. The user is asked to confirm that the retrieved cutting tool information is correct, or to correct the cutting tool information. The user may, for example, add or remove cutting tools 120 from a list. The user interaction may, for example, be performed by clicking on a touch screen 181. Embodiments may also be envisaged in which the user enters the cutting tool information manually. The system 180 may, for example, present a list of cutting tools 120 and the user may select the available cutting tools 120 from the list.

In the present embodiment, the system 180 retrieves the fixture information from a fixture database. Alternatively, the system 180 may receive the fixture information from the fixtures 140 themselves, for example via wireless communication. The system 180 informs the user of the machine fixture information retrieved, which may include a list of the available fixtures 140. The user is asked to confirm that the retrieved fixture information is correct, or to correct the fixture information. The user interaction may, for example, be performed by clicking on a touch screen 181. Embodiments may also be envisaged in which the user enters the fixture information manually. The system 180 may, for example, present a list of fixtures 140 and the user may select the available fixtures 140 from the list.

The system 180 may, for example, obtain further information about the machining site 100 and the available equipment. If some information needed to select suitable machining strategies from the database 170 is missing, the system 180 may, for example, prompt the user to enter the missing information via a user interface 181 such as a HMI.

The obtained machine tool information may, for example, indicate which types of cutting tools 120 and/or fixtures 140 that are compatible with the machine tools 110. The obtained machine tool information may, for example, indicate other properties of the machine tools 110, such as maximal rotation speeds or maximal torques for spindles of the machine tools 110, how the machine tools 110 can move or rotate the cutting tools 120 and the work piece 130 relative to each other.

The obtained information is indicative of constraints provided by the machining site 100 on which of the stored strategies are actually suitable to employ. Such constrains may also be affected by the tolerances specified in the PMI, as well as the material of the work piece 130 and the starting shape of the work piece 130.

In the method 200, geometric features to be machined as part of manufacturing the object are identified 230 based on the model 150 via a computer-implemented algorithm. An identified geometric feature may, for example, constitute a portion of the object to be manufactured, or may be an intermediate shape to be machined before the final shape of the object may be machined. Several schemes for such automatic detection of geometric features (also referred to as feature recognition) are known in the art, and such schemes are therefore not described further herein.

The database 170 is accessed 240 for each of the identified geometric features. The database 170 includes strategies for machining different geometric features. As described above, example geometric features are shown in FIG. 3. The database 170 includes a plurality of strategies defining different ways of machining an identified geometric feature.

One or more strategies from the plurality of strategies are selected 250 based on the obtained information. The strategies may, for example, be selected based on the machine tool information, the cutting tool information, the fixture information, and the PMI. The strategies may, for example, be selected also based on further properties of the manufacturing site and the equipment available therein.

A selected strategy may include at least:
a sequence of operations including for example facing, hole-making, and threading;
one or more machine tools 110 for performing the manufacturing;
one or more cutting tools 120 for use by the one or more machine tools 110,
one or more fixtures 140 for holding a work piece 130; and
tool paths for the one or more cutting tools 110.

The strategy may also include use of cooling fluids for providing cooling during the machining.

The strategy may also include means for determining suitable cutting data (such as feed rate, cutting speed, and depth of cut) based on the circumstances. The cutting data may, for example, be determined based on the material of the work piece 130, the tolerance set by the PMI 160, a selected tool path, and a selected cutting tool 120.

A computer simulation 260 is then performed to evaluate the selected strategies before instructions executable by the machine tools 110 are generated. The simulation 260 may, for example, be performed to check one or more of the following:
That the selected cutting tools 120 are available when needed;
That collisions are avoided;
That the cutting tools 120 reach the intended volumes so that they are able to cut where intended;
That the machined surface is within the prescribed tolerances when finished;
That tool wear is acceptable;
That the manufacturing time is acceptable.

The simulation may, for example, be performed by one or more processors 180. The result of the simulation may, for example, be provided to a user via a display 181.

A user interaction step 270 then allows the user to influence which of the selected strategies to employ, or whether to modify (or change) the selected strategies. The user interaction may be provided in the form of user instructions received via a user interface. The user interface may, for example, be a touch screen 181. The user interaction 270 will be described further below.

Instructions for causing one or more machine tools 110 to manufacture the object via subtractive manufacturing are then provided 280 based on a strategy of the one or more selected strategies. The system 180 may, for example, include a machine code generator 183 for generating the instructions for the machine tool 110 (or the instructions may be generated by the one or more processors 182). The instructions for the machine tool 110 may, for example, be provided in the form of CNC code.

The simulation 260 may be employed by the user to determine which of the selected strategies to employ for generating machine tool instructions. In a first example scenario, the system 180 selects 250 four strategies for machining a geometric surface. During the simulation 260, the performance of these selected strategies is evaluated, so that the user may select between them at the user interaction step 270. The simulation may, for example, reveal that one of the strategies is unsuitable due to collisions, while other strategies appear to work. Factors such as manufacturing time, tool wear and precision may be evaluated via the simulation, and the user may make a suitable tradeoff to select one of the strategies. The user-selected strategy may then be employed to generate 280 machine tool instructions.

In this first example scenario, the system 180 helps the user by presenting four proposed strategies for how to machine an identified geometric feature, thereby reducing a very complicated process planning task into a selection between four proposed strategies. Note that none of the proposed strategies are necessarily optimal (in many cases, finding the optimal strategy is practically impossible since the space of possible solutions is so large), but they serve as examples of possible solutions.

When the machine tool instructions have been generated, these instructions may be conveyed to the machine tools 110 so that the object defined by the CAD model 150 may be manufactured. In other words, a user having a CAD model 150 of an object, and associated PMI 160, may employ the system 180 to generate instructions for the machine tools 110, so that the machine tools 110 may manufacture the object. Hence, the user does not need any CAM software or CAM programming skills to be able to manufacture the object.

In a second example scenario, a single strategy is selected 250 by the system 180. The simulation 260 reveals a problem with the strategy, and the user modifies the strategy at the user interaction step 270 to overcome the problem. The user may, for example, reduce the cutting depth to reduce tool wear, or increase the cutting depth to reduce manufacturing time. The user may, for example, adapt a tool path that is undesirable for some reason.

In a third example scenario, a plurality of preliminary strategies is selected 251 by the system 180. The user detects (with or without use of a computer simulation) that all the selected preliminary strategies involve use of a certain cutting tool 120. The user would like to avoid that particular cutting tool 120, and therefore provides user instructions indicating that the cutting tool 120 should be avoided. The system 180 receives 252 the user instructions, and may then make a reselection 253 (or an updated selection) of strategies from the database 170 with the new constraint that a certain cutting tool 120 should be avoided. The reselected strategies may then be subjected to simulation 260.

In a fourth example scenario, a first strategy is selected 250 by the system 180 which only employs equipment which is currently available at the machining site 100, and a second strategy is also selected 250 by the system 180 which involves use of a cutting tool 120 and/or fixture 140 which is compatible with an available machine tool 110, but which is currently unavailable at the machining site 100. The system 180 provides the second strategy as an indication to the user of how new equipment may improve machining performance. The user may be unaware of new cutting tools 120 or fixtures 140 available on the market (or available at a remote location such a warehouse 190), or may be unaware of the performance of such new equipment. The simulation 260 may reveal to the user that machining performance may be improved via the second selected strategy in case the missing cutting tool 120 or fixture 140 is acquired. This is a convenient way to help users improve the machining performance. As new cutting tools 120 or fixtures 140 become available on the market, new strategies involving this new equipment may be added to the database 170, so that users of the system 180 may be informed of the performance of this new equipment.

The user selects whether to employ the first or second strategy proposed by the system 180, and appropriate machine tool instructions are then generated 280.

The machine tool instructions generated at the step 280 may be subjected to an optional simulation step 290. The simulation 290 may be employed to check that the machine tool instructions are indeed suitable for the actual machine tools 110. If problems are detected at the simulation 290, the user may, for example, cause the system 180 to return to the selection 250 of suitable strategies from the database 170, so that a different strategy (or a modified version of a strategy) may be tried.

An example of how a user may employ the system 180 will now be described with reference to FIG. 5. In the present example, the system 180 is implemented as a software application (or computer program) running on a tablet computer 180. Information is presented to the user via a touch screen 181 and the user enters information and instructions via the touch screen 181. However, embodiments may also be envisaged in which the user employs other input means, such as a keyboard and a pointing device (for example a mouse).

A machine tool database keeps track of the machine tools 110 available at the machining site 100 and their properties. The machine tool database also includes information regarding how to generate CNC code suitable for controlling the respective machine tools 110. Similarly, a cutting tool database keeps track of the cutting tools 120 available at the machining site 100 and their properties. The information stored in the cutting tool database may, for example, include parameters employed for determining suitable cutting data and/or tool paths for the respective cutting tools 120. The machine tool database and the cutting tool database could be stored locally in the tablet computer 180, but are typically stored at a server which is accessed via the internet.

When the user has started up the program and logged into an account, the user is prompted to update 501 the machine tool database. If the machine tool database is already up to date, then the user can proceed to the next step. Otherwise, the user enters information regarding new machine tools 110 and/or updates information regarding machine tools 110 already in the database. The user may, for example, select new machine tools 110 from a list of machine tools 110 available on the market. Information about the new machine tools 110 may, for example, be entered manually by the user, or may be retrieved automatically and stored in the machine tool database.

The user is also prompted to update 502 the cutting tool database. If the cutting tool database is already up to date, then the user can proceed to the next step. Otherwise, the user enters information regarding new cutting tools 120 (or new cutting tool assemblies) and/or updates information regarding cutting tools 120 (or cutting tool assemblies) already in the database. The user may, for example, select new cutting tools 120 from a list of cutting tools 120 available on the market. Information about the new cutting tools 120 may, for example, be entered manually by the user, or may be retrieved automatically and stored in the cutting tool database A 3D model of the object to be machined is loaded 503. The 3D model may be a CAD model, for example in the form of a STEP file including product and manufacturing information (PMI). However, other formats could also be employed for the 3D model. The 3D model may be retrieved from a database of stored models, or may be provided by the user.

The user is prompted to select 504 a machine tool 110 from the machine tool data base. A list of available machine tools 110 is presented to the user, and the user simply clicks on the machine tool 110 to be used.

A 3D stock model is defined 505 or loaded into the program. The stock model may, for example, be defined manually by the user, or may be selected by the user from a database of available stock models. The stock model may be defined via a STEP file, and may include material class and hardness. However, other formats could also be employed for the stock model. The stock model defines the work piece from which the object will be machined.

Coordinates for the work piece are then set 506. These coordinates serve as reference for the coordinate system of the machine tool 110.

The user is then presented with a visual representation of the object to be manufactured, where the object can be rotated to be viewed from different angles. The geometric features (or surfaces) of the object are selected 507 in the visual representation by clicking on them. The selected feature becomes highlighted.

When the user has selected 507 a geometric feature, the user is prompted to select 508 which machining process to employ for machining the geometric feature. A list of proposed machining processes (such as face milling, cavity, drilling) is presented and the user selects one by clicking on it.

The user is then prompted to select 509 a cutting tool 120 (or a cutting tool assembly). The user is presented with a list of suitable cutting tools 120 from the cutting tool database, and may select one by clicking on it. The list of suitable cutting tools is determined by the program based on factors such as the selected machine tool 110, the selected geometric feature, the selected machining process, and the work piece material.

The user is then prompted to select 510 a method for performing the selected machining operation with the selected cutting tool 120. The user is presented with a list of proposed methods involving different types of tool path patterns such as parallel or circular patterns (such as the example patterns shown in FIG. 4). The proposed methods also include feed direction (one way or bidirectional). As described above, the display 181 shows the object to be manufactured, and highlights the selected geometric feature. The selected tool path pattern is shown at the selected geometric feature so that the user can get a rough view of how the cutting tool 120 will move when machining the geometric feature. This provides the user with an easy way to review the outcome of the selections made for machining of the geometric feature.

Next, the user is prompted to define 511 cutting data such as cutting speed, feed speed, spindle speed, and feed per tooth. The user may also select whether to employ coolant, and whether to employ an internal or external coolant. The user may enter these things via the touch screen 181.

A computer simulation 512 is then performed for the machining of the selected geometric feature, so that the user may review the tool path.

The user selects 507 geometric features one by one, and the steps 508-512 are repeated 513 for each selected geometric feature. An additional computer simulation may then be performed which covers machining of the entire object, including all the geometric features of the object defined by the CAD model.

When all these steps 501-513 have been completed, the software application performs a post processing step 514 where it generates CNC code for controlling the machine tool 110 to machine the object in accordance with the selections made by the user. The executable CNC code is then transferred to the machine tool 110 for manufacturing of the object. The CNC code could for example be transferred from the tablet computer 180 to the machine tool 110 via a wireless connection. Alternatively, the CNC code could be transferred from the tablet computer 180 to the cloud (or to a server via the internet), and then from the cloud to the machine tool 110 (or from the server to the machine tool 110 via the internet).

As described above with reference to FIGS. 1-4, a database 170 stores strategies for machining different geometric features. The program described above with reference to FIG. 5 may employ such strategies for assisting the user. The strategy database 170 could be kept locally in the tablet computer 180, but is typically located at a server which is accessed via the internet.

As described above, the program may assist the user by proposing suitable cutting tools 120 and suitable tool path patterns. However, the strategies in the database 170 may be employed by the program to assist the user even further. When the user has selected 507 a geometric feature and has selected 508 a machining process, the program may propose suitable cutting tools 120 and associated strategies 515 for machining the geometric feature. A strategy 515 includes a proposed cutting tool 120, a proposed tool path pattern, and proposed cutting data, so the user does not need to perform the individual steps 509-511 himself. The user instead simply selects a strategy 515 among one or more strategies proposed by the program, and gets suggestions from the program for how to perform the machining. The user may review the cutting tool 120, the tool paths and the cutting data proposed by the selected strategy 515, and may modify or adapt these if needed. In some cases, the user may, for example, wish to replace the tool path pattern and/or the cutting data proposed by the strategy.

The software application described above with reference to FIG. 5 is useful in several different scenarios. In a first scenario, the user would like to manufacture an object as soon as possible with the currently equipment available. The software application then guides the user through the steps described above, and generates CNC code for manufacturing the object. The CNC code is transmitted from the tablet computer 180 held by the user to the machine tool 110 so that the machine tool 110 can manufacture the object. In this scenario, the software application only proposes use of strategies and cutting tools 120 currently available to the user, so that the machining can be performed straight away.

In a second scenario, the user is planning ahead for future manufacturing. In this scenario, the software application may propose cutting tools 120 and associated strategies which may improve quality of the machined object, or may reduce machining time and/or costs. Rather than only proposing use of cutting tools 120 and strategies currently available to the user (such as cutting tools 120 available at the machining site, and strategies already in the database 170), the software application may indicate to the user improvements that are possible if new cutting tools 120 and/or new strategies are acquired.

It will be appreciated that the software application described above with reference to FIG. 5 can be employed for generating CNC code suitable for different machine tools 110, not only for machine tools 110 from a certain manufacturer or for machine tools of a certain type.

The person skilled in the art realizes that the present invention is by no means limited to the preferred embodiments described above. On the contrary, many modifications and variations are possible within the scope of the appended claims. For example, many different geometric features than those shown in FIG. 3 may be covered by the database 170. Further, it will be appreciated that the cutting tool patterns shown in FIG. 4 merely serve as an example, and that many other tool path patterns may be envisaged. It will be appreciated that the machining site 100 depicted in FIG. 1 is a simplified example. For example, FIG. 1 only shows a single machine tool 110, a single cutting tool 120, and a single fixture 140, while a real machining site may typically include several available machine tools 110, cutting tools 120, and fixtures 140.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

What is claimed is:

1. A method comprising:
    obtaining a model of an object to be manufactured via subtractive manufacturing;
    obtaining information including information about one or more machine tools-available for manufacturing the object and information about one or more cutting tools available for use by the one or more machine tools to manufacture the object;
    identifying, based on the model, a geometric feature to be machined as part of manufacturing the object;
    accessing a database-including strategies for machining different geometric features the database including a plurality of strategies defining different ways of machining the identified geometric feature;
    selecting, based on the obtained information, a first strategy, which only employs equipment that is currently available at the machining site, and a second strategy involving use of a cutting tool and/or fixture that is currently unavailable at the machining site;
    performing computer simulation for the first and second selected strategies;
    indicating to the user that machining performance may be improved via the second selected strategy, if the currently unavailable cutting tool and/or fixture is acquired;
    receiving user instructions responsive to the computer simulation; and
    providing based on the user instructions and a strategy of the first or second selected strategies, instructions for causing one or more machine tools to manufacture the object via subtractive manufacturing.

2. The method of claim 1, further comprising:
    identifying, based on the model, a plurality of geometric features to be machined as part of manufacturing the object; and
    for each of the identified geometric features:
    accessing a database including strategies for machining different geometric feature, the database including a plurality of strategies defining different ways of machining the identified geometric feature; and
    selecting, based on the obtained information, the first or second strategies from said plurality of strategies, wherein the instructions for causing one or more machine tools to manufacture the object via subtractive manufacturing are provided based on a strategy of the first or second selected strategies for each of the identified geometric features.

3. The method of claim 1, wherein the identified geometric feature includes multiple subfeatures, and wherein said plurality of strategies define different orders in which to machine the sub features.

4. The method of claim 1, wherein said plurality of strategies define different patterns of tool paths for machining the identified geometric feature.

5. The method of claim 1, wherein the obtained information indicates one or more cutting tools available at the one or more machine tools or in a building where the one or more machine tools are arranged, and wherein the one or more strategies are selected based on the one or more indicated cutting tools.

6. The method of claim 1, wherein the obtained information indicates a tool interface of a machine tool of the one or more machine tools available for manufacturing the object, and wherein the first or second selected strategies are selected based on one or more cutting tools compatible with the tool interface.

7. The method of claim 6, wherein a strategy of the first or second selected strategies includes use of a cutting tool compatible with the tool interface but unavailable at the machine tool having the tool interface or unavailable in a building where the machine tool having the interface is arranged.

8. The method of claim 6, wherein the obtained information further indicates whether a cutting tool compatible with the tool interface, but unavailable at the machine tool having the tool interface or unavailable in a building where the machine tool having the interface is arranged, is available at another location, wherein the first or second selected strategies are selected based on the further indication.

9. The method of claim 1, wherein the obtained information indicates:
    a maximal rotation speed for a spindle of a machine tool of the one or more machine tools available for manufacturing the object; and/or
    a maximal torque for a spindle of a machine tool of the one or more machine tools available for manufacturing the object; and/or a maximal load for a spindle of a machine tool of the one or more machine tools available for manufacturing the object.

10. The method of claim 1, wherein the obtained information indicates:
which type of machining operations the one or more available machine tools are adapted to perform; and/or
whether the one or more available machine tools are adapted for 3-axis machining, 4-axis machining, 5-axis machining, or N-axis machining, where N is larger than 5; and/or
whether the one or more available machine tools include a machine tool operable to perform a combination of milling and turning; and/or
whether a spindle of a machine tool of the one or more available machine tools is adapted for vertical machining or horizontal machining.

11. The method of claim 1, wherein a machine tool of the one or more available machine tools includes an arm for holding a cutting tool or a work piece, and wherein the obtained information indicates:
a degree of susceptibility of the arm to deflection; and/or
a degree of susceptibility of the arm to vibration.

12. The method of claim 1, wherein the obtained information further includes information about one or more fixtures available for holding a work piece at one or more machine tools during manufacturing of the object.

13. The method of claim 1, wherein the obtained information indicates which one or more types of fixtures that are compatible with an available machine tool, wherein a strategy of the first or second selected strategies includes use of a fixture which is compatible with said available machine tool but is unavailable at said available machine tool or is unavailable in a building where said available machine tool is arranged.

14. The method of claim 1, wherein the obtained information indicates which one or more types of fixtures that are compatible with an available machine tool, wherein the obtained information further indicates whether a fixture compatible with said available machine tool, but unavailable at said available machine tool or unavailable in a building where said available machine tool is arranged, is available at another location, and wherein the first or second selected strategies are selected also based on the further indication.

15. The method of claim 1, further comprising:
receiving product and manufacturing information, PMI, indicating a tolerance for the object to be manufactured, wherein the selection of the first or second selected strategies is based also on the received PMI.

16. The method of claim 1, wherein each of the first and second selected strategies includes:
one or more machine tools for performing the manufacturing;
one or more cutting tools for use by the one or more machine tools;
one or more fixtures for holding a work piece; and
tool paths for the one or more cutting tools.

17. The method of claim 1, wherein the user instructions indicate:
selection of said strategy from among the first or second selected strategies previously selected from said plurality of strategies; and/or
modification of a strategy of the first or second selected strategies previously selected from said plurality of strategies to obtain a modified strategy, wherein the instructions for causing one or more machine tools to manufacture the object are provided based on said modified strategy.

18. The method of claim 1, wherein selecting, based on the obtained information, first or second strategies from said plurality of strategies comprises:
selecting, based on the obtained information, one or more preliminary strategies from said plurality of strategies;
receiving-initial user instructions indicating:
a machine tool employed in the one or more preliminary strategies to be avoided when machining the geometric feature; and/or
a machine tool to be employed for machining the geometric feature; and/or
a cutting tool employed in the one or more preliminary strategies to be avoided when machining the geometric feature; and/or
a cutting tool to be employed for machining the geometric feature; and/or
a fixture employed in the one or more preliminary strategies to be avoided when machining the geometric feature; and/or
a fixture to be employed for machining the geometric feature; and/or
tool paths employed in the one or more preliminary strategies to be avoided when machining the geometric feature; and/or
tool paths to be employed for machining the geometric feature; and
performing based on the initial user instructions, an updated selection of strategies from said plurality of strategies, wherein the instructions for causing at least one of the one or more machine tools to manufacture the object are provided based on a strategy from the strategies of the adapted selection.

19. The method of claim 1, wherein the one or more machine tools available for manufacturing the object are numerically controlled machine tools, and wherein the instructions provided based on a strategy of the first or second selected strategies include machine code executable by the one or more machine tools.

20. The method of claim 1, further comprising storing said plurality of strategies in the database prior to obtaining the model.

21. A computer program product comprising a computer-readable medium with instructions which, when executed by a computer, cause the computer to perform the method of claim 1.

22. A system, comprising:
a user interface for user interaction;
a database; and
a processor;
wherein the system is configured to perform a method comprising the steps of:
obtaining a model of an object to be manufactured via subtractive manufacturing;
obtaining information including information about one or more machine tools available for manufacturing the object, and information about one or more cutting tools available for use by the one or more machine tools to manufacture the object;
identifying, based on the model, a geometric feature to be machined as part of manufacturing the object;
accessing a database-including strategies for machining different geometric features, the database including a plurality of strategies defining different ways of machining the identified geometric feature;

selecting, based on the obtained information, a first strategy which only employs equipment which is currently available at the machining site, and a second strategy involving use of a cutting tool and/or fixture which is currently unavailable at the machining site;
performing computer simulation for the one or more selected strategies first and second strategies;
indicating to the user that machining performance may be improved via the second selected strategy, if the currently unavailable cutting tool and/or fixture is acquired;
receiving user instructions responsive to the computer simulation; and
providing based on the user instructions and a strategy of the first or second selected strategies, instructions for causing one or more machine tools to manufacture the object via subtractive manufacturing.

* * * * *